United States Patent [19]

Cayol et al.

[11] 3,930,940
[45] Jan. 6, 1976

[54] NUCLEAR FUEL SUBASSEMBLY

[75] Inventors: André Cayol; André Chalony, both of Aix-en-Provence; Georges Clottes, Manosque; Jean-Pierre Praizey; Jean Skok, both of Aix-en-Provence; Henri Venobre, Vinon-sur-Verdon, all of France

[73] Assignee: Commissariat a l'Energie Atomique, Paris, France

[22] Filed: Dec. 10, 1970

[21] Appl. No.: 96,782

[30] Foreign Application Priority Data
Dec. 12, 1969  France .............................. 69.43162
Nov. 20, 1970  France .............................. 70.41793

[52] U.S. Cl. ...................... 176/78; 176/79; 176/81
[51] Int. Cl.² ...................... G21C 3/08; G21C 3/10
[58] Field of Search .................... 176/76, 78, 81, 79

[56] References Cited
UNITED STATES PATENTS

| 3,215,606 | 11/1965 | Silvester | 176/78 X |
| 3,356,587 | 12/1967 | Heck | 176/78 |
| 3,442,763 | 5/1969 | Chetter et al. | 176/78 |
| 3,575,808 | 4/1970 | Jakub et al. | 176/81 |
| 3,607,642 | 9/1971 | Murdock | 176/81 |
| 3,625,822 | 12/1971 | Mantle | 176/81 |
| 3,629,066 | 12/1971 | Anderson | 176/78 |

Primary Examiner—Stephen C. Bentley
Attorney, Agent, or Firm—Cameron, Kerkam, Sutton, Stowell & Stowell

[57] ABSTRACT

A nuclear fuel sub-assembly comprises a bundle of fuel pins provided with helical spacers and located within a shroud for the coolant. The sub-channels at the periphery of the bundle are restricted in order that the rate of flow matches the heat transfer surfaces in all sub-channels. For this purpose the spacers of the outer pins project radially by an extent smaller than the spacers of the inner pins. In addition longitudinal ribs may be provided in the outer sub-channels.

5 Claims, 10 Drawing Figures

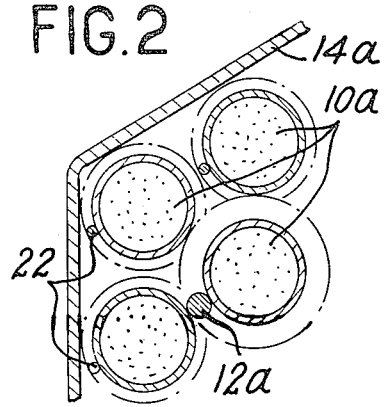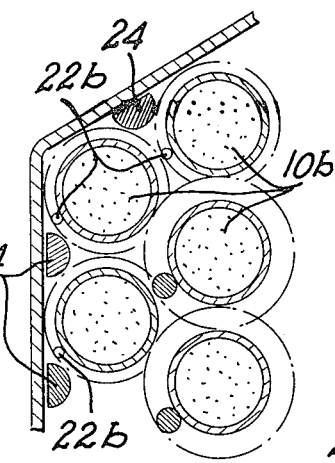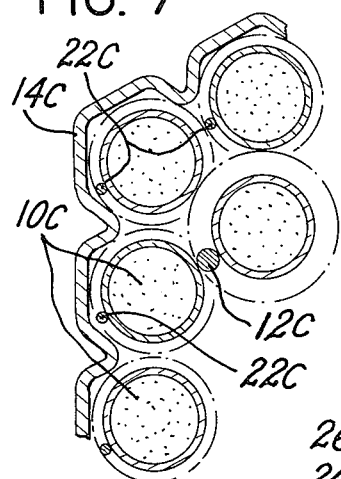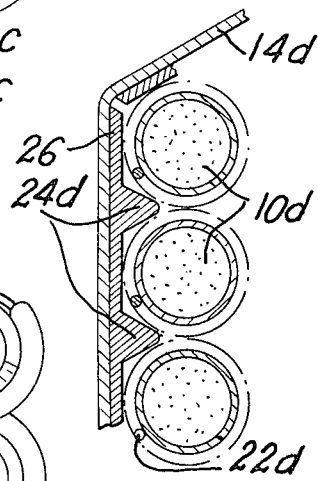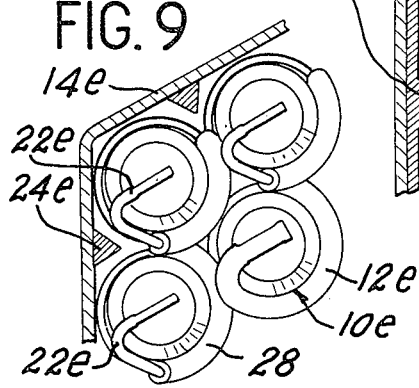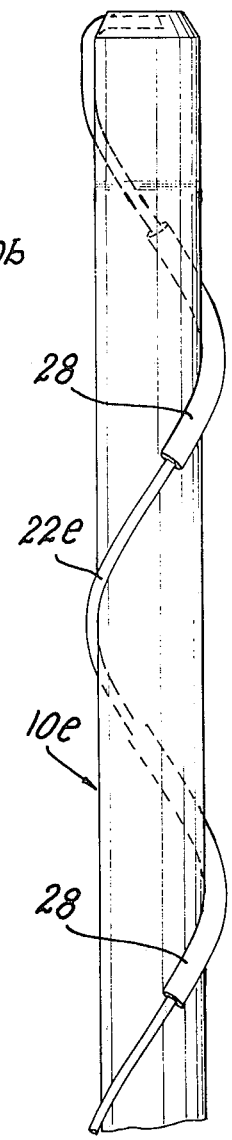

NUCLEAR FUEL SUBASSEMBLY

This invention relates to fuel sub-assemblies (sometimes also called fuel assemblies) for nuclear reactors having a high power density such as liquid metal cooled breeder reactors which operate predominently on fast neutrons. Fuel subassemblies for this purpose comprise at least one cluster of elongated parallel pins containing fuel (fissile or fertile material), said fuel pins being disposed on a uniform lattice (usually hexagonal) and contained within a shroud or sleeve along which the coolant flows. The relative spacing of the pins in each cluster is determined by means of spacer members (wires, small-diameter tubes or fins) which are helically wound on each fuel pin with a large pitch.

In the fuel sub-assemblies which were in use up to the present time, the radial projection of the spacer members was the same in the case of all fuel pins and the distance by which each spacer projected from the pin was identical at all points of the spacer. This arrangement has a drawback : even if the cluster is tightly packed and the shroud is applied against the fuel cluster in perfectly intimate relation, subchannels defined by the outer fuel pins of the cluster and by the shroud exhibit a head loss coefficient which is lower than that of the central sub-channels and the coolant in the outer fuel channels comes into contact with a smaller pin can area. In consequence, the coolant which passes through the outer sub-channels is heated to a lesser extent than the coolant which passes through the inner sub-channels (between inner fuel pins) and therefore has a lower temperature when leaving the cluster. This phenomenon is attenuated to only a partial extent by mixing due to turbulences and heat transfer processes between adjacent sub-channels and remains objectionable. In fact, in respect of a pre-established value of coolant temperature at the outlets of the sub-channels and therefore of the temperature of the fuelpin cans at this level (the temperature being limited by the high-temperature strength of the canning materials), the mean temperature of the coolant at the outlet of the cluster is lower, thereby resulting in a reduction in reactor efficiency.

The aim of the invention is to provide a nuclear fuel assembly which meets practical requirements more effectively than assemblies of the prior art, especially insofar as the assembly is no longer attended by the above-noted disadvantage or at least only to a very limited degree.

To this end, the invention proposes a nuclear fuel assembly comprising at least one cluster of canned-fuel pins disposed on a uniform lattice within a sleeve through which the coolant is circulated, each fuel pin being provided over at least the greater part of its length with a helical spacer member which determines the spacing between each fuel pin and the adjacent pins or the sleeve. Essentially, the distance to which each spacer member of a lateral fuel pin of the cluster projects radially from said pin in the zones in which said spacer member is applied against the sleeve is smaller than the radial distance of projection of the spacer members which are carried by the central fuel pins of the cluster.

In one embodiment of the invention in which the spacer members are constituted by helically wound wires, the wire is flattened in those portions in which it is applied against the sleeve and the flattening is preferably such as to produce a reduction in the rate of flow within the peripheral sub-channels in order to obtain the same temperature at the outlets of all the channels whether said channels are delimited solely by fuel pins or both by fuel pins and by the sleeve.

In another embodiment, the spacer members are constituted by wires and the wires of each lateral fuel pin have a smaller diameter than those of the other fuel pins and are threaded through tube sections having an external diameter which is the same as that of the wires carried by the central fuel pins, said tube sections being placed in the zones in which the lateral fuel pins bear on the cental fuel pins or on the adjacent lateral pins.

Again according to a particular mode of application of the invention, the sleeve is provided with internal longitudinal ribs which reduce the cross-sectional area of the sub-channels for the flow of coolant between the lateral fuel pins.

A better understanding of the invention will be gained from the following description of one arrangement according to the prior art and of arrangements according to the invention which are given by way of example without any limitation being implied. The description relates to the accompanying drawings in which:

FIG. 2 is a detail view on a large scale showing a portion of the transverse cross-section of a fuel assembly in accordance with one embodiment of the invention;

FIGS. 6, 7 and 8 which are similar to FIG. 2 show further embodiments of the invention;

FIG. 9 which is similar to FIG. 2 is a top view of the fuel pins and corresponds to yet another form of application of the invention;

FIG. 10 is a diagrammatic view in elevation showing a portion of a fuel pin in accordance with the alternative form of FIG. 9.

Figure 1:
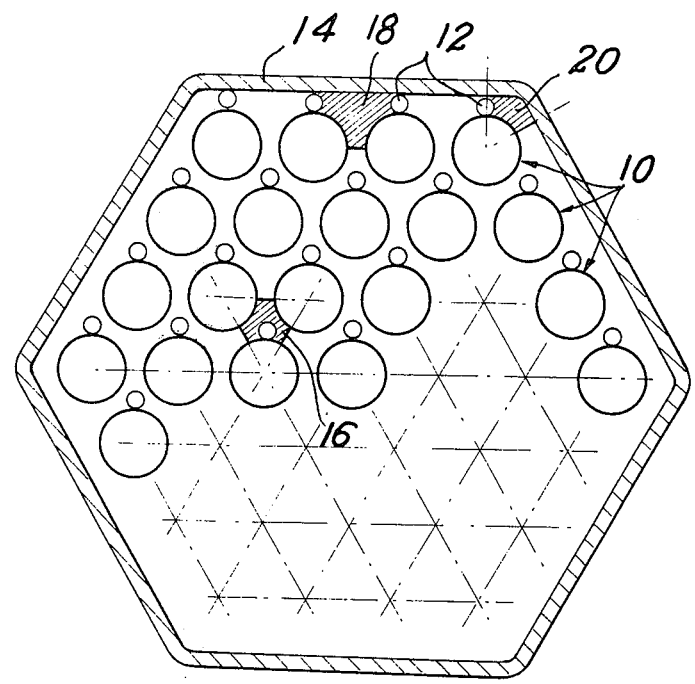
FIG. 1 shows diagrammatically the transverse cross-section of a fuel assembly in accordance with the prior art.

The fuel assembly which is illustrated in transverse cross-section in FIG. 1 is of a type which is in very wide use at the present time. The assembly consists of a cluster of canned nuclear fuel pins 10 of elongated shape which are located at the nodes of a uniform hexagonal lattice. The fuel pins are carried by a support grid (not shown in FIG. 1), said grid being attached to a sleeve 14 which limits a duct for the circulation of coolant. The relative spacing of the fuel pins is determined by means of a spacing device which comprises in the case of each fuel pin 10 a metal wire 12 which is wound in a helix on the can and is applied against the cans of adjacent fuel pins or against the wall of the sleeve.

The coolant flows in a general direction at right angles to the plane of FIG. 1 through a series of subchannels which communicate with each other and are delimited either solely by fuel pins or by fuel pins and the sleeve. In the case which is illustrated in which the fuel-pin lattice is triangular and in which the sleeve has a hexagonal transverse cross-sectional shape, the subchannels can be divided into three groups:

A first group is constituted by the sub-channels 16 of generally triangular shape each formed by the space which is provided for the coolant by three adjacent fuel pins which are located at the apices of a triangle Heating surfaces extend over one-half of the periphery of said subchannels 16 which are provided in the gratest number; they will be referred-to hereinafter as "inner sub-channels" and the fuel pins which are surrounded only by said sub-channels will be referred-to as "inner fuel pins." The rate of flow through each inner sub-channel will be designated as $Di$.

A second group is constituted by the subchannels 18 which will be referred-to as "edge sub-channels" and are each constituted by the space which is provided for the coolant by two fuel pins located at the periphery of the cluster (so-called "edge pins") and by the corresponding portion of one face of the sleeve 14. The sub-channels are limited by heating surfaces which represent in the same manner as the preceding sub-channels approximately one-half of the surface of one fuel pin. The rate of flow through each edge sub-channel will be designated as $Db$.

A third group is constituted by the sub-channels 20 or so-called "corner sub-channels," the number of which is equal to the number of corners of the transverse cross-section of the sleeve 14. Each sub-channel 20 is constituted by the space which is provided for the coolant between a "corner pin" located within a dihedron of the sleeve 14 and the two wall portions of the sleeve which constitute said dihedron. The coolant which flows through a corner subchannel is surrounded by a heat-transfer surface which represents one-sixth of the surface area of a fuel pin. The rate of flow through a corner sub-channel will be designated as $Dc$.

Finally, the fuel pins and sub-channels which form part of the second group and the third group will be generally designated by the terms "lateral sub-channels" and "lateral fuel pins" in contrast to the "inner sub-channels" and "inner fuel pins."

If not consideration is given to the unitary pressure drops within the sub-channels which arise essentially from the spacer wires, the heating to which the coolant is subjected is identical within all the sub-channels which are assumed to be isolated from each other only on condition that the following relation is satisfied:

$Di = Db = 3 Dc$

If this condition is fulfilled, the outlet temperature of the coolant will be substantially equal in all the sub-channels provided that the inlet temperatures are the same.

If no account is taken of unitary pressure drops which are essentially due to the presence of the spacer wires, t can be considered that the flow rate $D$ within a given sub-channel is provided by the formula:

$$D = K \cdot S \cdot y^{0.66} \quad (1)$$

In this formula, $S$ is the transverse cross-sectional area of the sub-channel, $y$ is the hydraulic diameter of he channel and $K$ is a coefficient which is identical in he case of all sub-channels but is a function of the ressure difference between the upstream and downtream ends of the sub-channels.

In the case of an assembly in accordance with the rior art of the type illustrated in FIG. 1, it is observed at the equality relation given above is not satisfied nd that we have:

$Di < 3 Dc < Db$

Referring now to FIGS. 2 to 10, there will now be described a number of different arrangements according to the invention which make it possible to achieve or at least come close to the conditions of equilibrium of the channels.

In order to satisfy or at least approximate to the condition $Di = 3 Dc$, it is necessary to reduce the spacing between each corner pin and the sleeve. In the form of construction which is illustrated in FIG. 2 (in which the components corresponding to those illustrated in FIG. 1 bear the same reference numerals to which is assigned the index $a$), this result is achieved by providing each lateral fuel pin 10$a$ with a spacer wire 22$a$ having a smaller diameter than that of the spacer wires 12$a$ which are fitted on the inner fuel pins. The ratio to be adopted between the diameters of the wires 22$a$ and 12$a$ in order to satisfy the relation $Di = 3 Dc$ will evidently be a function of the diameter of the fuel pins and of the diameter of the wires 12$a$. The ratio can be determined by making use of the above formula (1) which gives $D$ as a function of the cross-sectional area of the channel and of the hydraulic diameter. In the case of a fuel pin diameter of the order of 7 mm and a spacing of 1 mm between inner pins, that is to say in the case of conditions commonly met with, the ratio between the diameters of the wires 22$a$ and 12$a$ is found to be of the order of 0.6.

Figure 3:
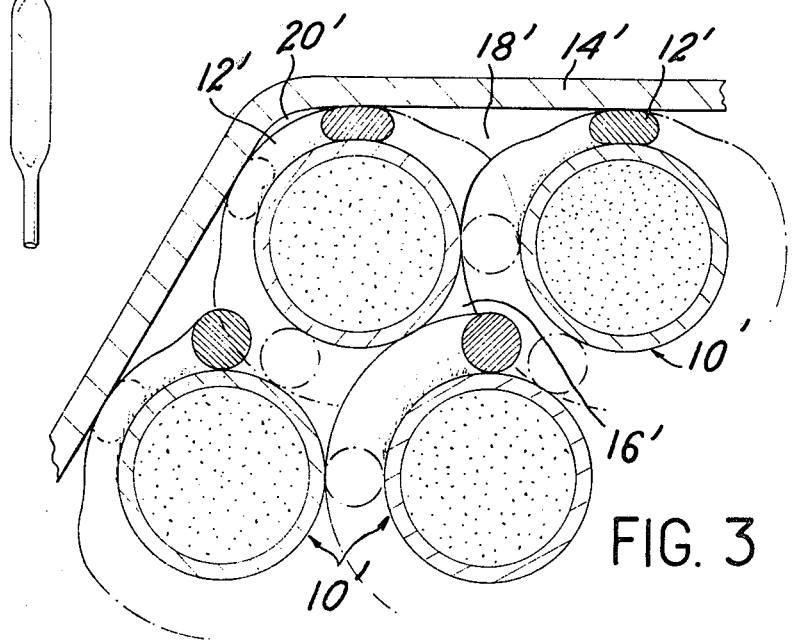
FIG. 3 is a detail view showing a portion of the transverse cross-section of a fuel assembly in accordance with the invention.

The difference in heat build-up between the central sub-channels and corner sub-channels is also minimized if the arrangement illustrated in FIG. 3 is adopted. This figure illustrates on a large scale a portion of the transverse cross-section of a fuel assembly and again shows a sleeve 14' in which are placed canned-fuel pins 10'. Each fuel pin is again fitted with a helically wound spacer wire 12' which has a constant diameter in the case of the central fuel pins. However, in contrast to the wire 12 of FIG. 1, the wire 12' extends from the can to a radial distance which is not constant in the case of the lateral fuel pins. This radial distance is smaller in the zones of the wire which are intended to be applied against the sleeve 14' than in the zones which are intended to be applied against the can of an adjacent fuel pin, the radical distance of projection in the zones last mentioned being the same as the constant distance of projection from the pins of the central portion. The sleeve 14' evidently has slightly smaller dimensions than in the case of FIG. 1.

The difference between the maximum distance of projection of the wires 12' and the minimum distance of projection will evidently be chosen so that the coolant temperature at the outlets of all the sub-channels 16, 18 and 20 should be substantially the same. In order that the sleeve 14' should be intimately applied against the spacer wires 12' and thus leave no clearance which would constitute a short-circuit, use can advantageously be made of a sleeve of the type which was illustrated and described in French Pat. No. 1,519,592 as filed on Dec. 5, 1966 by Commissariat a l'Energie Atomique.

Figure 4:
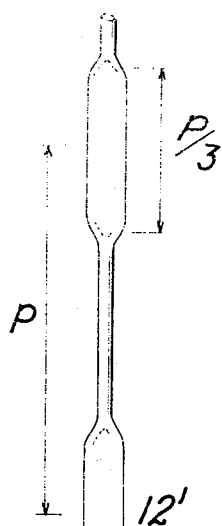
FIG. 4 shows diagrammatically a spacer wire which is deformed prior to mounting on a peripheral fuel pin of the cluster of FIG. 3.

In the embodiment which is illustrated in FIGS. 3 and 4, the periodic modifications of the radial projection of the wires 12' which are intended to be placed on the lateral fuel pins are made by flattening the wire at intervals by pinching, for example. If $p$ designates the pitch of the wire (that is to say the length of wire between two points which will be located on a same generator-line of the can), it will be possible to pinch the wire 12' along sections having a length of approximately $p/3$ at intervals $p$. The distance of pinching will evidently be greater in the case of corner-pin wires.

Particular care must obviously be taken at the time of positioning of the wire on the can to ensure that the flattened portions are placed at levels which are different in the case of lateral fuel pins which cooperate with different faces of the sleeve 14: the need for this arrangement is apparent from FIG. 3 in which the wires 12' are all shown in cross-section at the same level.

Figure 5:
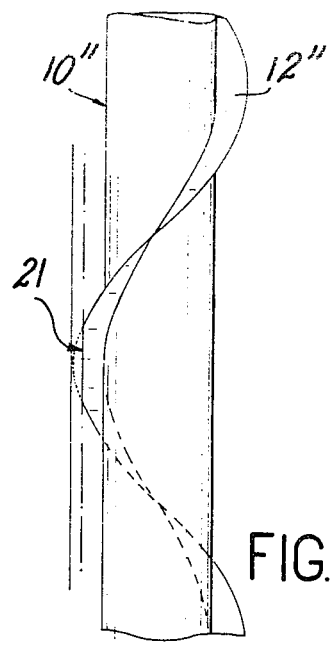
FIG. 5 shows diagrammatically in elevation a portion of a fuel pin in an alternative form of the invention.

It is readily apparent that the helical spacer members can be constituted by components other than wires. For example, as illustrated in FIG. 5, each fuel pin 10'' can be provided with a fin 12''. The fin of each lateral pin is then truncated as shown at 21 in FIG. 5.

The arrangements illustrated in FIGS. 2 to 5 make it possible to bring the cross-sectional area and the hydraulic diameter of the corner sub-channels to values which balance the flow rates within the corner sub-channels and the inner sub-channels. But the correlative reduction in cross-sectional area and hydraulic diameter of the edge channels is not sufficient to ensure that the condition $Di = Db$ is also satisfied. In the embodiment which is illustrated in FIG. 6, this second condition is satisfied by providing the walls of the sleeve 14b with longitudinal ribs 24 which project between all the adjacent lateral fuel pins 10b and fill a suitable proportion of the primitive edge sub-channels. The ribs 24 which are illustrated in FIG. 6 are constituted by strips of semi-circular cross-sectional shape which are placed against the flat internal face of the sleeve 14b. Said strips are attached by welding or brazing.

The embodiment which is illustrated in FIG. 6 can permit a number of different alternatives insofar as concerns on the one hand the shape of the ribs and on the other hand the structural arrangement of these latter. In the alternative form which is illustrated in FIG. 7, the wall of the sleeve 14c is deformed in order to constitute longitudinal ribs 24c. In the variant shown in FIG. 8, six plates 26 are provided with ribs 24b and are engaged by sliding between the suitably dimensioned sleeve 14d and the lateral fuel pins 10d. It is apparent that the ribs 24d of FIG. 8 have a shape which is no longer semi-circular but triangular. Again in all these cases, the transverse cross-sectional shape of the ribs is determined by means of the above formula (1) and by taking into account the fact that the radial distance of projection of the wires 22 is smaller than that of the wires 12.

While the arrangements shown in FIGS. 2, 6, 7 and 8 do in fact serve to balance the inner sub-channels with the corner sub-channels as well as to reduce the unbalance between the edge sub-channels and the inner sub-channels (shown in FIG. 2) or even virtually to remove said unbalance (as shown in FIGS. 6, 7 and 8), these arrangements are nevertheless atteneded by one disadvantage: as can be seen by making a comparison between on the one hand FIG. 1 and on the other hand FIGS. 2 and 6, a number of bearing points at which the fuel pins are applied against each other by means of spacer wires has been dispensed with. In particular, it is apparent that the lateral fuel pins are no longer applied against each other. In order to eliminate this disadvantage, wires which project to a variable radial distance can be mounted on the lateral fuel pins (this arrangement being shown in FIGS. 3 and 4) or, alternatively, the solution illustrated in FIGS. 9 and 10 can be adopted. In these figures, the components which correspond to those already shown bear the same reference numerals to which is assigned the index $e$. The lateral fuel pins of the cluster carry a spacer wire 22e having a smaller diameter than the wires 12e which are provided on the inner fuel pins. The cross-sectional area of the lateral sub-channels is thus reduced. Tube sections 28 are engaged over the wires 22e and have an external diameter which is equal to that of the wires 12e. The length and position of said tube sections are such that each lateral fuel pin is applied against the adjacent pins by means of said sections whereas that portion of the wire which is located opposite to the sleeve 14e remains uncovered. In practice, each tube section which is carried by an edge pin will represent between one-half and two-thirds of one turn of the helically wound wire 22e. The tube sections carried by the corner pins will have a slightly smaller length.

In the embodiment which is illustrated in FIG. 9, the sleeve is further provided with internal ribs 24e which are intended to balance the flow within the edge sub-channels and the inner sub-channels. Said internal ribs are constituted by longitudinal splines of triangular cross-sectional shape and are formed in one piece with the sleeve 14e.

It will be readily apparent that the invention is not limited solely to the embodiments which have been described by way of example with reference to the accompanying drawings and that the scope of this patent extends to any alternative form which remains within the definition of equivalent means.

We claim:

1. A nuclear fuel sub-assembly comprising a shroud of substantially polygonal cross-section containing at least one cluster of elongated parallel fuel pins disposed on a uniform lattice, said shroud having an inlet and an outlet for receiving and discharging a coolant which circulates in the shroud along a direction generally parallel to the pins, each fuel pin being provided over at least the greater part of its length with radially projecting helical spacer means providing a minimum spacing between each fuel pin and the adjacent pins or the shroud, the length of the radial projection of the spacer means on each outer fuel pin of the cluster where said spacer means engage the shroud being smaller than the length of the radial projection of the spacer means on each inner fuel pins of the cluster, the spacer means being a wire, the wires of the inner fuel pins and mounted in tube sections having an external diameter the same as that of the wires carried by the inner fuel pins, said tube sections being placed in the zones in which the outer fuel pins confront inner fuel pins and adjacent outer pins and internal longitudinal ribs on said shroud projecting between the outer fuel pins.

2. A fuel sub-assembly according to claim 1, wherein the cross-section of said longitudinal ribs is such that the flow within each sub-channel limited by outer fuel pins and a flat portion of the shroud is substantially equal to the flow within each sub-channel limited by inner fuel pins only.

3. A fuel sub-assembly according to claim 1, wherein said longitudinal ribs consist of strips secured to the internal face of the shroud.

4. A fuel sub-assembly according to claim 1, wherein said ribs consist of longitudinal deformations of the shroud.

5. A fuel sub-assembly according to claim 1, wherein said ribs are formed on plates which are slidably engaged between the shroud and the fuel cluster.

* * * * *